Feb. 20, 1962 YASUSHI HOSHINO ET AL 3,022,078

MAGNETIC RECORD SHEET FOR A MAGNETIC RECORDING AND READING APPARATUS

Filed Jan. 22, 1957 3 Sheets-Sheet 1

3,022,078
MAGNETIC RECORD SHEET FOR A MAGNETIC RECORDING AND READING APPARATUS

Yasushi Hoshino, Minoru Sato, and Mamoru Namikawa, Tokyo, and Shigezo Tochihara, Kawasaki-shi, Japan, assignors to Tokyo Denki Kagaku Kogyo Kabushiki Kaisha, Tokyo, Japan, a corporation of Japan Filed Jan. 22, 1957, Ser. No. 635,504
Claims priority, application Japan Jan. 25, 1956
1 Claim. (Cl. 274—41.4)

This invention relates to a magentic record sheet for a magnetic recording and reading apparatus, more particularly to a magnetic record sheet characterized by that it comprises a carrier sheet and a magnetic recording film coated thereon, the demarcation lines between the carrier sheet and the magnetic coating film on opposite sides being parallel lines, the width of the magnetic coating film being equal through all its length to the pitch of heads arranged at equal intervals on the rotary body of a magnetic recording and reading apparatus so that one of he heads is always maintained in contact with the magnetic recording film of the magnetic record sheet in operation, and the carrier sheet having margins not covered by the magnetic coating film in which margins holes being provided for setting the magnetic record sheet in correct position on the magnetic recording and reading apparatus in operation.

According to one embodiment of this invention, the sheet has a photographic emulsion film on the opposite surface of the carrier sheet and the descriptions, drawings, photographs may be produced conveniently by optical means.

According to another embodiment of this invention, the magnetic record sheet may be reinforced on the circumferential part by reinforcing treatment so that deformation of the sheet due to variation of temperature or humidity as well as any damage due to external mechanical forces may be effectively prevented.

According to one aspect of this invention the magnetic recording film may be conveniently formed by utilizing a transmitting sheet carrying the magnetic recording film.

According to this invention, the magnetic record sheet may have elasticity by combining an elastic layer and a relatively dense layer, and the magnetic record sheet can afford good result thanks to the elasticity and the evenness of the surface of the magnetic recording film formed on the smooth flat layer.

The characteristics and advantages as described above as well as other characteristics and advantages of this invention will become clearer as the descriptions made hereafter with reference to accompanying drawings showing some embodiments of this invention, for illustration but with no intention of limiting the scope of the invention, proceed, wherein.

Firstly, a brief explanation will be made about a magnetic sound recording and reading apparatus.

Figure 1:
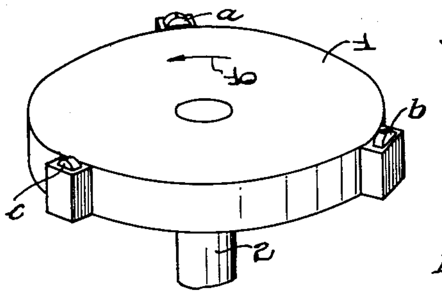
FIG. 1 is a perspective view of a rotary body for supporting heads of a magnetic recording and reading apparatus.
Figure 2:
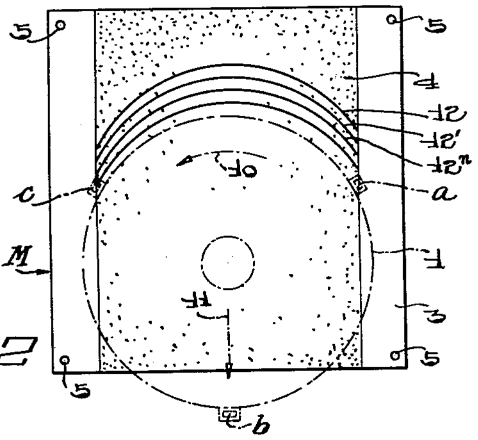
FIG. 2 is a plan view of a magnetic record sheet viewed from the magnetic coating film side.
Figure 3:
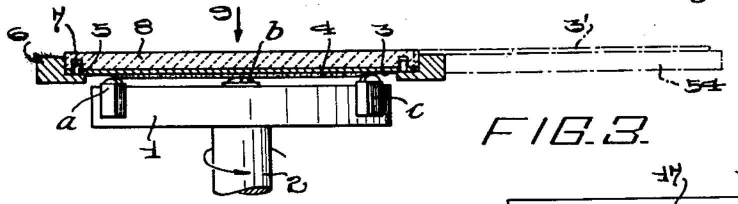
FIG. 3 is a side view partly in section of a magnetic record sheet mounted on the rotary body of a magnetic recording and reading apparatus.

In FIG. 1, a rotary body 1 rotates around its axis 2. Said rotary body has a plurality of heads for magnetic recording or reproducing arranged at equal intervals (heads are three in the embodiment shown). The direction of the gap of each head is radial in relation to the rotation axis 2. FIG. 2 represents a magnetic sound record sheet M which is composed of a non-magnetic carrier 3 of paper, plastic or the like and a magnetic coating film 4. The sheet M has setting holes 5 for setting the sheet on a definite position of the magnetic recording and reading apparatus. In FIG. 3, a frame 6 has guide pins 7 and the magnetic record sheet is adapted to be placed on a definite position in the frame 6 by passing the pins 7 through the setting holes 5 of the sheet M. 8 is a pressing plate and heads *a*, *b* and *c* bear lightly against the surface of the coating film 4 of the sheet M, confronting with the pressing plate 8. The sheet M has drawings, descriptions or the like on the upper surface of the carrier 3 in contact with the pressing plate 8, and the drawings, the descriptions or the like can be seen from the top in the direction of the arrow 9 through the transparent pressing plate 8. When the rotary body 1 is rotated around its axis 2 in the direction of the arrow 10 and at the same is shifted in the direction of the arrow 11 while electric current corresponding to sound to be recorded is passed to each of the heads, magnetic sound record tracks 12, 12' and 12'' may be formed. In reproducing the sound by scanning the tracks as formed in the above by reproducing heads, one can read or see the descriptions, the drawings or the like on the top surface of the sheet M in the direction of the arrow 9 while hearing the reproduced sound and thus the benefit of simultaneous hearing and reading of the magnetic sound recording and reading apparatus can be obtained.

This invention relates to the magnetic record sheet for the use on such a magnetic sound recording and reading apparatus. The sheet according to this invention has on one surface a magnetic coating film which is adapted to be always in contact with one of the heads arranged at equal intervals of a magnetic recording reproducing and reading apparatus, the width of the magnetic coating film being demarcated by parallel straight lines and leaving margins not coated by the magnetic film on both sides. The width of the magnetic coating film must be equal to the pitch of the heads arranged at equal intervals in the magnetic sound recording and reading apparatus. If the width of the magnetic coating film is too wide, toward the end of recording or reproducing of the first head but before the completion of the operation of said head, the second head will reach the magnetic coating film and thus duplicated recording or reproducing will be caused. Under such condition, no good result can be obtained in recording or reproducing.

On the other hand, if the width of the magnetic recording film is too narrow, the second head can not reach the magnetic coating film when the first head leaves from the magnetic coating film and thus there will be interruptions in recording and reproducing. Such a sheet is of course unusable.

The margin of the sheet on the side of the magnetic coating film serves to bring the head on a plane approximately on the same level with the plane of the magnetic coating film before reaching the film and to avoid jerking motions of the head which may otherwise occur when the head comes into contact with the magnetic coating film due to the thickness of the sheet M. It is ascertained by the inventors that smooth continuous recording and reproducing can be obtained by providing margins of the sheet even if slight unevenness at the edge of the magnetic coating film may exist.

Now with reference to one of the embodiments of the sheet, this invention will be explained more in detail.

Figure 4:
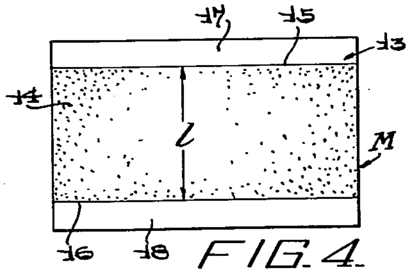
FIG. 4 is a plan of a magnetic record sheet.
Figure 5:
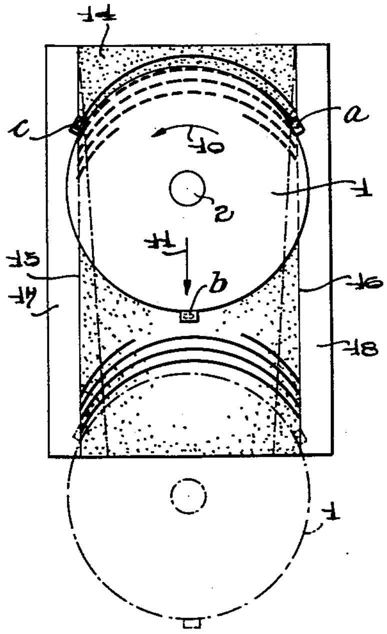
FIG. 5 is a plan showing the scanning relation of heads on the magnetic sound record sheet.

In FIG. 4, 13 is a carrier of non-magnetic material such as paper, plastic and the like, 14 is a magnetic recording coating film while 17 and 18 are margins of the carrier 13 not coated by the magnetic film 14 and 15, 16 are edges of the coating film 14 or boundary lines between the coating film 14 and the margins 17, 18. The width *l* of the magnetic coating film 14 is equal to the linear distance between two adjoining heads *a*, *b* of a plurality of heads arranged at equal intervals as shown in FIG. 5. The edge lines 15 and 16 are parallel as shown in the drawing and therefore the width of the magnetic recording film is *l* throughout its length. The margins 17 and 18 serve not only to secure smooth entering into and departing from the contact with the magnetic film of the heads as stated before but also to facilitate the setting of the sheet M in expanded condition on the recording and reading apparatus.

When the surface of the record sheet M on the side not coated by the magnetic coating film is coated with light sensitive material and a photograph is developed on this surface, a sheet having a photograph on this surface and a sound record on the other surface may be obtained, and such a sheet will be very convenient for practical use in various cases.

Figure 6:
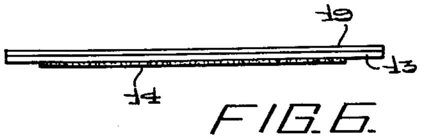
FIG. 6 is a side view of a sound record sheet having elasticity.
Figure 7:
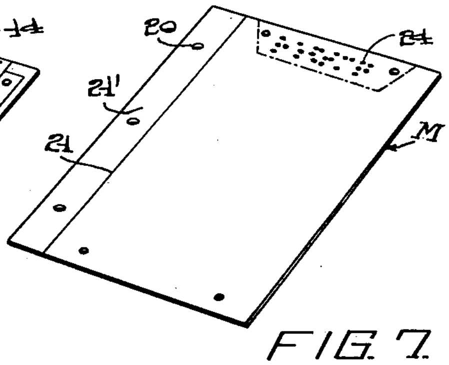
FIGS. 7 and 8 are perspective views of some particular sound record sheets.
Figure 8:
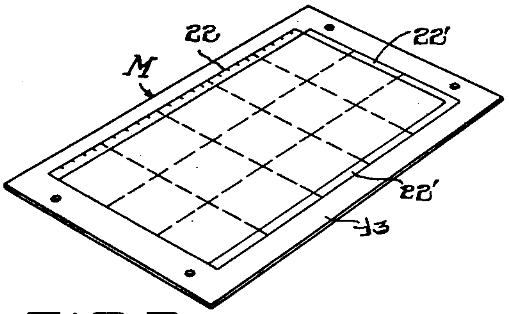

In FIG. 6, 13 is a carrier of a material such as paper, plastic or the like, 19 is a layer of light sensitive material such as sensitive emulsion or sensitive agent for blue print, and 14 a magnetic recording film. It is to be understood that the surfaces of the carrier may be coated partly by the sensitive layer and the magnetic coating film. As shown in FIG. 7, if holes 20 are provided for the purpose of filing, it will be convenient in keeping the record sheets M in order in a file. In such a case, it is advisable to have a part 21' not covered by the light sensitive material demarcated by a folding line 21, since it will prevent the damage of the picture on the sheet M in filing. It is also advisable to print a scale 22 or a column of marking 22' as shown in FIG. 8 on the front surface of the carrier 13 of the sheet M to facilitate the reference of the position of the sound record to the descriptions on the front surface. The provision of the indication or the heading in braille points or other marks 24 as shown in FIG. 7 will promote the use of the sheet of this invention.

Now the formation of the magnetic coating film of the magnetic record sheet as described above will be explained.

It is preferable to use for the carrier of the magnetic coating film a sheet formed by adhering in overlapping relation a sheet of flexible and elastic material and a sheet affording a dense and hard surface for obtaining a good magnetic sound recording and reproducing as explained in the following.

For obtaining good recording and reproducing, it is necessary to maintain close contact between the head and the magnetic recording film and to carry out relative motion between the two. Accordingly it is desirable for the magnetic coating film to have a carrier which has a good effect as a cushion. For this purpose, a material such as moisture absorbing paper, filter paper, porous rubber, elastic synthetic resin or the like is most suitable. However, on the other hand, the magnetic record sheet of this invention should have a surface which is smooth and flat in order to secure intimate contact with the head and the magnetic coating film supported on said surface. Accordingly it is preferable to form the carrier in order to satisfy the two requirements as mentioned above by combining a layer of a material which is porous and a sheet which is dense and relatively hard such as European paper, art paper or the like by adhering the latter on the surface of the former.

Figure 9:
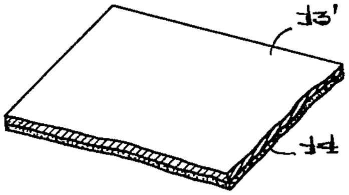
FIG. 9 is a perspecitve view of a part of a conventional magnetic record sheet.

FIG. 9 illustrates the structure of a conventional sound record sheet formed by a carrier 13 of synthetic resin and a magnetic recording film 14.

Figure 10:
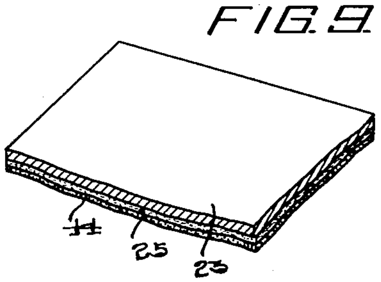
FIGS. 10 and 11 are a perspective view and a sectional view of a part of a magnetic record sheet formed by attaching a layer of dense smooth surface on a layer of elastic material.
Figure 11:
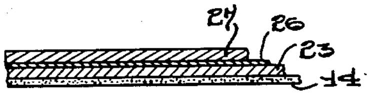

In contrast to such a sheet, a magnetic record sheet of FIG. 10 showing one of the examples of the sheet of this invention comprises an elastic carrier 25 of a material such as moisture absorbing paper, filter paper, cloth, porous plastic, rubber or the like, a magnetic coating film 14 and a sheet 23 of relatively dense and hard nature such as European paper pasted on the other side of said carrier 25. In such a sheet, the elastic carrier has porous structure or rough surface and consequently the magnetic coating film applied thereon will have uneven surface according to unevenness of the elastic carrier. This may cause undesirable effect slightly on the close contact of the recording or reproducing head with the magnetic coating film and may bring about undistinctness of the sound, degradation of sound record properties of high frequency, generation of noise or the like. In order to overcome these difficulties, in the embodiment of FIG. 11, a magnetic coating film 14 is coated on a smooth flat surface of a carrier 23 of a material such as paper, plastic or metallic foil and on the other surface of said carrier is formed a thin layer 26 of an adequate thermoplastic material, for example a mixture of vinyl acetate, ethyl acetate, butyl acetate and the like. Then a sheet 27 of moisture absorbing paper, filter paper or other porous elastic material which is suitable for printing or writing and at the same time soft and elastic is placed in overlapping relation, and the overlapping sheets are passed between heated rollers to adhere these sheets by the thermoplastic layer 26. The thermoplastic layer of synthetic resin adhesive is dissolved and the carrier 23 and the elastic layer 27 will be perfectly adhered with each other to give an elastic sound recording sheet.

According to one aspect of this invention, in forming a magnetic recording film of a magnetic record sheet of this invention, a transmitting paper may be utilized very conveniently.

When it is desired to form a magnetic coating film on the back surface or on a part of said surface of a sheet having printed descriptions, pictures, photographs or the like, it is a general practice to coat a magnetic material on said back surface to form the magnetic coating film. In such an operation, a liquid is generally used as the coating material. When a liquid is used as the coating material, it is very troublesome and difficult to coat the liquid exactly in the limited area as desired because of the fluidity of the liquid. Moreover, when the sheet is dried after the application of the liquid, the sheet tends to have irregular complicated distortion, curvature, shrinkage and the like. It will be difficult to obtain a satisfactory sound recording and reproduction from such a sheet.

According to this invention, all these difficulties will be eliminated by utilizing a specific transmitting paper, and the use of liquid coating material is entirely avoided and consequently the operation may be greatly simplified while it gives a magnetic coating film of exactly predetermined dimension. The sheet will not have any undesirable distortion, curvature and shrinkage.

Figure 12:
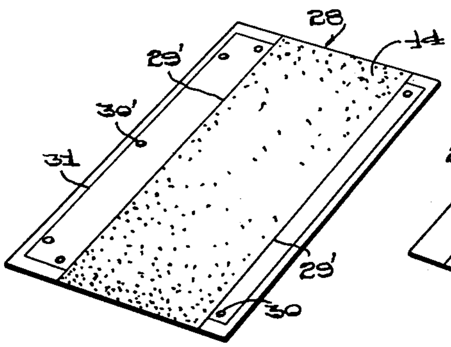
FIG. 12 is a perspective view of a magnetic record sheet having a magnetic record film prepared by transmission.
Figures 13, 14, 15:
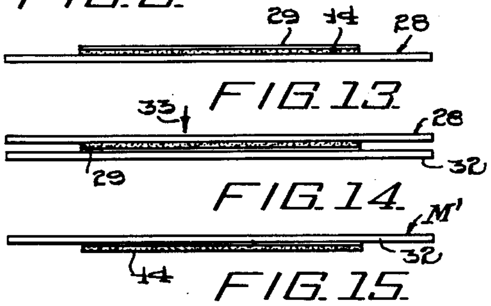
FIGS. 13, 14 and 15 are side views showing various stages of transmission of a magnetic coating film.

In FIGS. 12 and 13, the transmitting sheet comprises a sheet 28 of a material such as polyester film, cellophane, paper or the like and a magnetic coating film 14 to be transmitted thereon. On the magnetic coating film 14 is deposited adhesive paste 29 which exhibits very powerful adhesive effect when applied on other material under heating or pressure, for example, a material such as polyvinyl acetate which softens when heated and acts as a powerful adhesive paste, or a plastic for adhesive tape which exhibits a powerful adhesive effect when applied by pressing. When the latter is used, it is preferable to cover the adhesive agent with a layer of a material which hardly adheres to the adhesive agent for the convenience of preservation and handling and to remove the said cover when the transmitting sheet is used. It is well known that high adhesive plastic paste has only very slight adhesive effect towards a certain specific plastic sheet and such a sheet can be easily separated from high adhesive plastic paste when desired, as seen in adhesive tape wound in a spiral form widely used.

The magnetic film 14 is formed between two parallel lines 29', 29' as seen in FIG. 12 and the carrying sheet 28 has marks 30, 30' and 31 prepared by printing or otherwise. The mark 30 corresponds to the position of the guiding hole of the magnetic record sheet M to be produced which serves in setting said sheet on the magnetic recording and reproducing apparatus, the mark 30' to the position of the hole of said sheet M for filing, while the mark 31 shows the outside line of said magnetic recording sheet. The use of these marks will be explained hereafter.

As shown in FIG. 14, a sheet 32 of paper, plastic or other like materials having a printed picture, photograph or the like on one surface and intended to have a magnetic coating film on the other side is placed on a fixed plate, facing the surface having the description downwardly and thereon is placed the assembly of the transmitting sheet of FIG. 13 to have the adhesive paste layer 29 in contact with the back surface of the sheet 32 and is pressed uniformly from the direction of the arrow 33. By the powerful adhesive force of the paste, the magnetic coating film is adhered firmly on the back surface of the sheet. When the adhesive paste layer 29 is of a material of thermoplastic, the assembly of the sheets is pressed by heated rollers or iron plates or the like and then is cooled to form a consolidated sheet. If the adhesive material is of such a kind as to exhibit adhesive effect when wet, moisture may be added before pressing.

After the pressing operation the carrying sheet 28 of the transmitting sheet is removed from the sheet 32 which has now the transmitted magnetic coating film to obtain a magnetic recording sheet M as shown in FIG. 15 which has printed descriptions, drawings, photographs or the like on one surface and the magnetic coating film of required dimension transmitted on the other surface.

For using this magnetic recording sheet on a magnetic recording and reading apparatus, the sheet will be cut and pierced holes according to the marks 30, 30', 31 as mentioned before and it will be easily accomplish ready for the use.

As described before, the transmitting sheet of this invention, has various marks printed as shown in FIG. 12, and these marks indicate the outside dimension to which size the magnetic recording sheet shall be cut later, the position of the magnetic recording film on the magnetic record sheet, the position of guiding holes for setting the magnetic recording sheet in correct position on the magnetic recording and reading apparate and others, and therefore it is very convenient in deciding the relative position between the sheet 28 and the sheet 32. It will be also convenient to utilize this transmitting sheet in deciding the position of the descriptions on the magnetic record sheet or the trimming of the photograph on said sheet because it has various marks as described in the above. The sheet 32 itself has no marks such as 30, 30' and 31 but these marks may be easily reprinted on the surface of the sheet 32 by using proper ink suitable when these marks are printed on the transmitting sheet 28, or the sheet may be cut and pierced holes before the separation of the sheet 28 from the sheet 32 according to the indications on the transmitting sheet.

Figure 16:
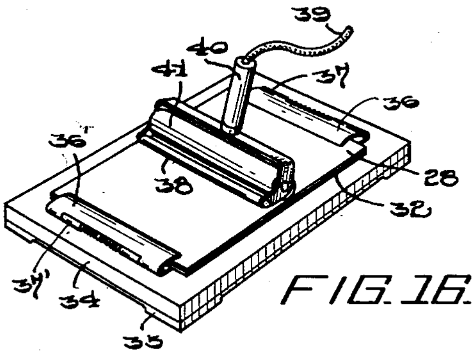
FIG. 16 is a perspective view showing one of the examples of the apparatus for carrying transmission of the magnetic coating film.

FIG. 16 is a drawing showing one example of the transmission operation as described above. In the drawing, 34 is a table for supporting the sheet 32 to which the magnetic recording film is to be transmitted and the transmitting sheet 28. When the table plate 34 is of a material such as glass, the setting of the sheets 28 and 32 is facilitated by observing the sheets by the assistance of the light passed through the transparent plate 34 from the bottom. The table is provided with legs 35 at bottom corners and pressing plates 36, 36' hinged on the plate by hinges 37, 37' to hold the sheets placed on the table. The heating roller 41 is connected to an electric source by a cord 39 and has a handle 40 and is heated by an inside electric heater (not shown) in operation. When the roller 41 is rolled, light pressure is applied by the small pressing roller 38 on the sheets 28 and 32. In operation firstly the sheets 28 and 32 are placed in proper overlapping relation on the plate 34 and held by the pressing plates 36, 36' in a fixed position and the roller 41 is rolled on the sheet 28 to adhere the magnetic film 14 on the sheet 32 by the adhesive paste layer 29. Thus the transmission operation is carried out very easily.

According to another aspect of this invention, a treatment for prevention of deformation of the magnetic coating film due to variation of humidity and temperature and others may be applied and thus the function property of the magnetic record sheet may be promoted. The magnetic record sheet has a carrier of a material such as paper, plastic and the like, and the magnetic record sheet which is elastic by having a layer as mentioned before has the tendency to be deformed easily by the variation of temperature and humidity as well as by mechanical external force. When such a deformation occurs, it will become difficult to set the sheet in the right position on the recording and reading apparatus, for example, the guiding holes may not fit on the guiding pins on the apparatus any longer, or the sound reproduced may be degraded in volume and quality of the sound or may be disturbed by noises occurring due to the fact that the sound tracks of the sheet do not coincide exactly with the locus of the reproducing head.

Figure 17:
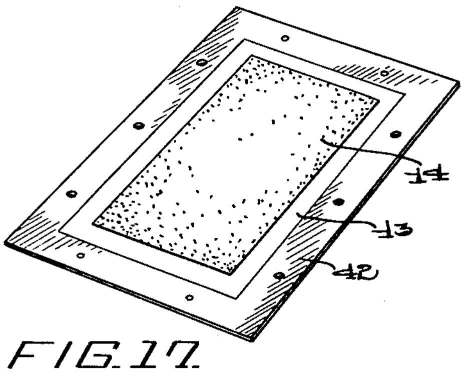
FIG. 17 is a perspective view of a magnetic record film subjected to reinforcement treatment.

One of the objects of this invention is to prevent the deformation as described above so that the sound recording sheet may be always placed in the right determined position on the recording and reading apparatus and also to prevent damage of the sheet by mechanical external forces as far as possible. For this purpose, along the external circumference, a reinforcing treatment, for example, treatment of impregnation of a solution of synthetic resin or adhesion of reinforcing element, may be applied. FIG. 17 illustrates one of the embodiments of such an operation. The carrier 13 having the magnetic coating film 14 coated thereon is generally of an elastic material, and is reinforced in the circumferential part by impregnating plastic by coating and hardening the same or by pasting a very thin metallic leaf or a synthetic resin plate on one surface or both surfaces to form mechanically strengthened circumferential portion 42.

When the magnetic record sheet is to be preserved or to be forwarded by post in folded condition, the reinforcement may be omitted along the folding lines. The operation of piercing holes for guiding, filing, etc. on such a reinforced sheet may be carried out conveniently by using an apparatus as described below.

Figure 18:
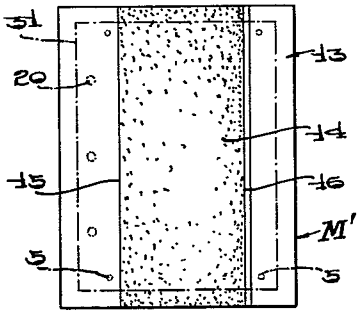
FIG. 18 is a plan view of a magnetic record sheet not yet finished.

FIG. 18 shows a sheet M' having a magnetic coating film 14 formed between lines 15 and 16 but not yet finished. The magnetic coating film 14 has been applied by coating a magnetic sound record forming material directly on the carrier sheet 13 or transmitting a magnetic coating film from a transmitting sheet as described before to the carrier sheet 13 by means of an adhesive paste as explained before. The operations left to be carried out for completion are cutting of the sheet and piercing guiding holes 5 and filing holes 20 in definite positions as indicated by dotted lines.

As already explained, the cut line 31 and the guiding holes 5 for setting must be formed exactly in correct positions in relation to the magnetic coating film 14. One of the objects of this invention is to provide an apparatus to perform such an operation.

Figure 19:
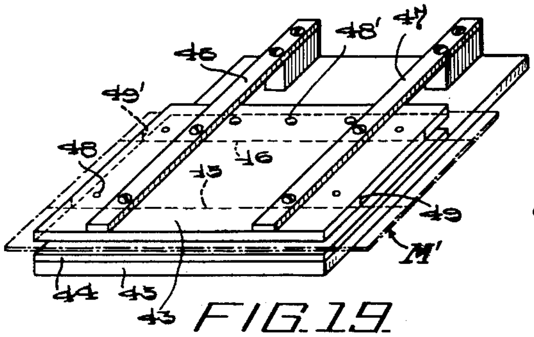
FIG. 19 is a perspective view of an apparatus which operates hole piercing and cutting of an unfinished magnetic record sheet.

In FIG. 19, a pair of plates 43, 44 having an equal external dimension to the accomplished magnetic recording sheet are placed in confronting relation separated from each other by a small space into which an unfinished magnetic recording sheet M' is to be inserted as shown by dotted lines. 45 is a base plate and the plate 43 is supported by metallic arms 46 and 47 fixed on said base plate 45. The plate 43 is provided with control holes 48, 48' for the purpose of controlling the operation of piercing holes for guiding and filing in the magnetic record sheet M'.

Since the piercing mechanism through the controlling holes 48, 48' is similar to a conventional mechanism for piercing holes in paper, the descriptions and drawings thereof are omitted in this specification.

In piercing holes in the unfinished sheet M' with an apparatus as shown in FIG. 19, it is preferable to provide indicating marks 49, 49' on either or both of the plates 43 and 44 and to perform piercing of holes after registering the corresponding demarcation lines 15 and 16 of the coating film in conformity with the marks, since it will facilitate the operation for forming holes in exactly accurate position in relation to the magnetic coating film. A cutter may be added to the apparatus of FIG. 19 in order to execute the cutting of the sheet after piercing holes to give the sheet the determined outside dimension, that is, the dimension corresponding to that of plates 43 and 44.

Figure 20:
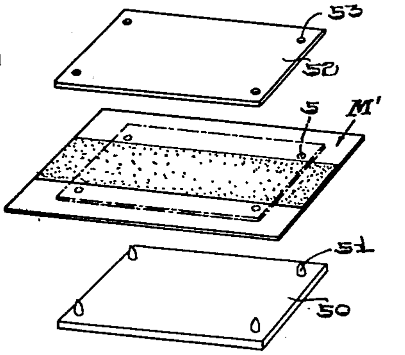
FIG. 20 is a perspective decomposed view of another apparatus of hole piercing and cutting different from FIG. 19.
Figure 21:
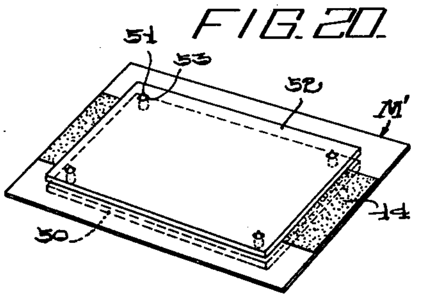
FIG. 21 is a perspective view showing the apparatus of FIG. 20 in assembled condition.

The cutting operation may also be executed by means as shown in FIGS. 20 and 21. The plate 50 in FIG. 20 has projected pins 51 in positions of guiding holes of the magnetic recording sheet to be finished. The corresponding plate 52 has the same size as the plate 50 and holes 53 in positions corresponding to pins 51. The magnetic recording sheet M' which has already holes pierced but not yet cut into a determined size is inserted as shown in a perspective view of FIG. 21 between the two plates 50 and 52, passing through the guiding holes on the pins 51 of the plate 50. The sheet M' is then cut into a determined configuration and dimension by a suitable cutting machine or by a knife.

When the sheet as described above is set on a magnetic recording and reading machine as shown in FIG. 3, one can see or read the descriptions, drawings, photographs or the like on the top surface of the sheet through the transparent pressing plate 8, but can not write on the sheet. It is, however, desirable to have a space 3' for writing or additional descriptions, drawings, photographs which is continuous with the part having the magnetic record film on the back surface and can be placed on the additional panel 54 provided on the side of the recording and reproducing mechanism as shown in FIG. 3. This arrangement is important for the promotion of the advantageous use of the magnetic recording and reading apparatus. For this purpose in FIG. 22, the sound record sheet M has the magnetic recording sheet 14 only on one side of the sheet and the other half side is left as a continuous part 13' of the carrier sheet 13 reserved for writing. It will be evident that the back surface of the part 13' can also be used for writing by turning back this part towards the part 14 when the front surface is not sufficient for writing.

Figure 22:
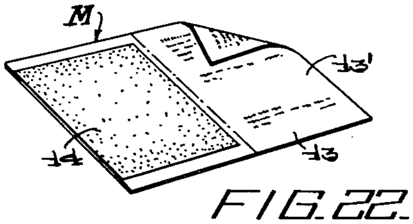
FIGS. 22, 23 and 24 are perspective views of magnetic record sheets of various types.
Figure 23:
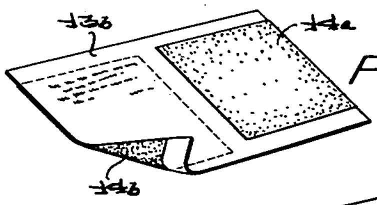
Figure 24:
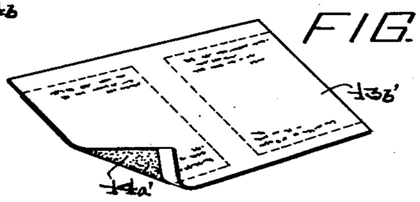

If desired, the sheet of the type of FIG. 22 may be modified as shown in FIG. 23 or FIG. 24. In FIG. 23, the sheet has two magnetic recording films 14a, 14b but on opposite half sides and on opposite faces. When the magnetic film 14a is placed under expanded condition under the pressing plate 8 in a frame 6 for operation, for example for reproducing, the magnetic recording film 14b is facing upward, but by turning this side on the pressing plate 8, the surface 13b will be brought in the position facing upward ready for writing or showing the description of this surface. The magnetic coating film 14b may be placed similarly for operation of recording or reproducing and on this occasion the back surface corresponding to the magnetic coating film 14a may be used for writing or additional descriptions.

In the embodiment of FIG. 24, there is only one magnetic coating film on the part 14a' and this magnetic coating film is expanded and fixed under the pressing plate 8 for recording or reproducing and the surface 13b' is used for writing on the panel 54 while the back surface of the part 13b contains an additional description and drawings.

According to this invention, a sheet suitable for reading and writing while hearing the sound recorded may be obtained.

What is claimed is:

For use on magnetic sound recording and reproducing apparatus of a type which comprises a panel plate provided with setting pins for positioning a magnetic record sheet in predetermined position thereon and a turntable which is provided with a plurality of transducing heads equidistantly spaced around its circumference, the turntable being mounted rotatably around on an axis and being shiftable in a longitudinal direction below the panel plate so that the magnetic record sheet will be scanned by the transducing heads for sound recording and reproducing, a magnetic record sheet comprising a paper sheet having one surface including visual indicating means thereon and another surface, and a magnetic coating film on the other surface and centrally located to define film-free marginal portions on the sheet, the magnetic record sheet being provided with setting holes adapted for engagement with the setting pins of the panel, the sheet comprising two layers respectively of a soft paper material and a hard paper material, the magnetic coating film being located on the hard paper material and the visual indicating means being a developable light-sensitive material.

References Cited in the file of this patent

UNITED STATES PATENTS

| | | |
|---|---|---|
| 1,096,822 | Brandt | May 19, 1914 |
| 1,401,006 | Soderberg | Dec. 20, 1921 |
| 2,333,463 | Bryce | Nov. 2, 1943 |
| 2,369,572 | Kallmann | Feb. 13, 1945 |
| 2,479,868 | Rossman et al. | Aug. 23, 1949 |
| 2,494,018 | Urquhart | Jan. 10, 1950 |
| 2,501,465 | Caramanoff | Mar. 21, 1950 |
| 2,541,136 | Warren | Feb. 13, 1951 |

(Other references on following page)

UNITED STATES PATENTS

| | | |
|---|---|---|
| 2,547,838 | Russell | Apr. 3, 1951 |
| 2,668,718 | Roberts | Feb. 9, 1954 |
| 2,677,200 | MacChesney | May 4, 1954 |
| 2,720,264 | Taylor et al. | Oct. 11, 1955 |
| 2,822,425 | Hicks | Feb. 4, 1958 |

FOREIGN PATENTS

| | | |
|---|---|---|
| 325,199 | Great Britain | Feb. 6, 1930 |
| 326,765 | Great Britain | Mar. 14, 1930 |
| 657,494 | Great Britain | Sept. 19, 1951 |
| 891,627 | Germany | Oct. 1, 1953 |